(12) United States Patent
Hokuto et al.

(10) Patent No.: US 7,599,787 B2
(45) Date of Patent: Oct. 6, 2009

(54) FUEL INJECTION CONTROL DEVICE FOR ENGINE

(75) Inventors: Hiroyuki Hokuto, Numazu (JP); Ritsuo Masaki, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 207 days.

(21) Appl. No.: 11/886,948

(22) PCT Filed: Mar. 7, 2006

(86) PCT No.: PCT/JP2006/304837

§ 371 (c)(1),
(2), (4) Date: Sep. 24, 2007

(87) PCT Pub. No.: WO2006/103902

PCT Pub. Date: Oct. 5, 2006

(65) Prior Publication Data

US 2009/0082937 A1     Mar. 26, 2009

(30) Foreign Application Priority Data

Mar. 29, 2005   (JP) ............................. 2005-096401

(51) Int. Cl.
*G06F 19/00* (2006.01)
*F02D 41/06* (2006.01)
*F02M 51/00* (2006.01)
(52) U.S. Cl. ..................... 701/113; 123/431; 123/491
(58) Field of Classification Search ......... 701/101–105, 701/113, 115; 123/179.4, 179.17, 295, 305, 123/431, 491
See application file for complete search history.

(56) References Cited

U.S. PATENT DOCUMENTS

| 5,894,832 | A  | * | 4/1999 | Nogi et al. ................... 123/491 |
| 6,340,014 | B1 |   | 1/2002 | Tomita et al. |
| 7,377,248 | B2 | * | 5/2008 | Hokuto ........................ 123/431 |
| 7,438,048 | B2 | * | 10/2008 | Onobayashi et al. ......... 123/352 |
| 7,470,211 | B2 | * | 12/2008 | Ueura et al. ............. 123/198 C |
| 2002/0046730 | A1 |   | 4/2002 | Hosokawa et al. |
| 2006/0016430 | A1 |   | 1/2006 | Sadakane et al. |
| 2009/0138181 | A1 | * | 5/2009 | Hokuto ........................ 701/106 |

FOREIGN PATENT DOCUMENTS

EP    0 943 793 A2    9/1999
EP    1 201 901 A2    5/2002

(Continued)

*Primary Examiner*—Willis R Wolfe, Jr.
(74) *Attorney, Agent, or Firm*—Oliff & Berridge, PLC

(57) ABSTRACT

A fuel injection control device for an engine including a cylinder injector and an air intake passage injector is provided. The device changes a fuel injection style, from a compression stroke cylinder injection by the cylinder injector which is executed from a predetermined instant immediately after the beginning of the cold start of engine until a predetermined period has passed, to the combination of an air intake passage injection by the air intake passage injector, an intake stroke cylinder injection and a compression stroke cylinder injection by the cylinder injector which is executed after the predetermined period has passed. During the cold start of engine, the favorable combustion stability is obtained by the compression stroke cylinder injection before the predetermined period has passed, and an amount of HC is reduced after the passage of the predetermined period, promoting warming-up of catalyst.

4 Claims, 6 Drawing Sheets

FOREIGN PATENT DOCUMENTS

| | | |
|---|---|---|
| JP | A-63-154816 | 6/1988 |
| JP | A 01-155043 | 6/1989 |
| JP | A 02-191820 | 7/1990 |
| JP | A-11-022507 | 1/1999 |
| JP | A-11-324765 | 11/1999 |
| JP | A 2000-008916 | 1/2000 |
| JP | A-2000-145510 | 5/2000 |
| JP | A 2001-073854 | 3/2001 |
| JP | A 2001-336439 | 12/2001 |
| JP | A-2005-054615 | 3/2005 |
| JP | A-2005-061332 | 3/2005 |
| WO | WO 2006/009313 A1 | 1/2006 |

\* cited by examiner

FUEL INJECTION CONTROL DEVICE FOR ENGINE

TECHNICAL FIELD

The present invention relates to a fuel injection control device for an engine, particularly to a fuel injection control device for an engine provided with a cylinder injector for injecting fuel into the interior of a cylinder and an air intake passage injector for injecting a fuel to an air intake passage.

BACKGROUND ART

In general, in a so-called direct injection type gasoline engine having a cylinder injector, the fuel injection in a latter period of the compression stroke and the largely delayed ignition are made during the fast idling after the beginning of the cold start of engine so that after the fuel component unburnt in the combustion stroke has been exhausted from a combustion chamber, it after-burns in an exhaust port or an exhaust manifold to facilitate the warming-up of catalyst by using the resultant hot exhaust gas and restrict the discharge of HC.

However, a demand still exists for further improving the warming-up of catalyst and more restricting an amount of discharged HC during the cold start. On the other hand, for example, in Japanese Patent Application Laid-open No. 2001-73854, there is a disclosure that in a gasoline engine of a so-called dual-injection type having an air intake passage injector in addition to a cylinder injector, the fuel is separately injected from each of the injectors during the fast idling.

In the conventional fuel injection pattern or style, however, it is impossible to reduce an amount of discharged HC to a sufficiently low level during the cold start. While, when such a separate fuel injection is carried out, the combustion stability; i.e., the torque variation; becomes worse in comparison with the direct injection type, whereby it is necessary to adopt the optimum fuel injection style in the cold start in view of the above point.

DISCLOSURE OF THE INVENTION

The present invention has been made in view of the above-mentioned circumstances, and an object thereof is to provide a fuel injection control device for an engine being able to optimize both of an amount of HC in the exhaust gas and the combustion stability during the cold start of engine.

To achieve the above object, according to one aspect of the present invention, a fuel injection control device for an engine is provided, comprising a cylinder injector and an air intake passage injector, characterized in that means is provided for changing a fuel injection style, from a compression stroke cylinder injection by the cylinder injector which is executed from a predetermined instant immediately after the beginning of the cold start of engine until a predetermined period has passed, to the combination of an air intake passage injection by the air intake passage injector, an intake stroke cylinder injection and a compression stroke cylinder injection by the cylinder injector which is executed after the predetermined period has passed.

The compression stroke cylinder injection has an advantage in that the combustion stability is maintained to restrict the variation of torque even if the temperature in the combustion chamber is low. On the other hand, a style of separate injection comprising the air intake passage injection, the intake stroke cylinder injection and the compression stroke cylinder injection has an advantage in that the warming-up of catalyst is more accelerated in comparison with the compression stroke cylinder injection to reduce the amount of HC in the exhaust gas. Accordingly, if the injection style is changed as mentioned above, it is possible to optimize both of the amount of HC in the exhaust gas and the combustion stability.

The predetermined period is preferably determined based on an amount of intake air integrated from the beginning of the cold start of engine.

The combustion stability relates to the temperature in the combustion chamber, while the temperature in the combustion chamber is relied on the frequency/degree of combustion in the combustion chamber. Accordingly, the determination whether or not the temperature in the combustion engine reaches a value at which the combustion is stable is preferably based on a parameter which reflects the frequency/degree of combustion. The integrated amount of intake air is favorable as such a parameter, whereby it is possible to ideally change the fuel injection style by determining the predetermined period based on the integrated amount of intake air and obtaining the timing for changing the fuel injection style.

An instant at which the predetermined period finishes is preferably an instant at which the amount of intake air integrated from the beginning of the cold start of engine reaches a predetermined threshold, and in that the threshold is obtained based on a temperature of engine water at the beginning of the cold start of engine.

The period during which the temperature reaches a value at which the combustion is stabilized is relied on the temperature of engine water at the beginning of the cold start of engine. Accordingly, by determining the threshold based on the temperature of engine water at the beginning of the cold start of engine, it is possible to vary the predetermined period in accordance with the variation of the temperature of engine water at the beginning of the cold start of engine to change the fuel injection style at an optimum timing.

According to the present invention, an excellent effect is achievable wherein both of the amount of HC amount in the exhaust gas and the combustion stability are optimized during the cold start of engine.

The above and other objects, effects, features and advantages of the present invention will become more apparent from the following description of embodiments thereof taken in conjunction with the accompanying drawings.

BEST MODE FOR CARRYING OUT THE INVENTION

One preferred embodiment of the present invention will be described below in detail with reference to the attached drawings.

Figure 1:
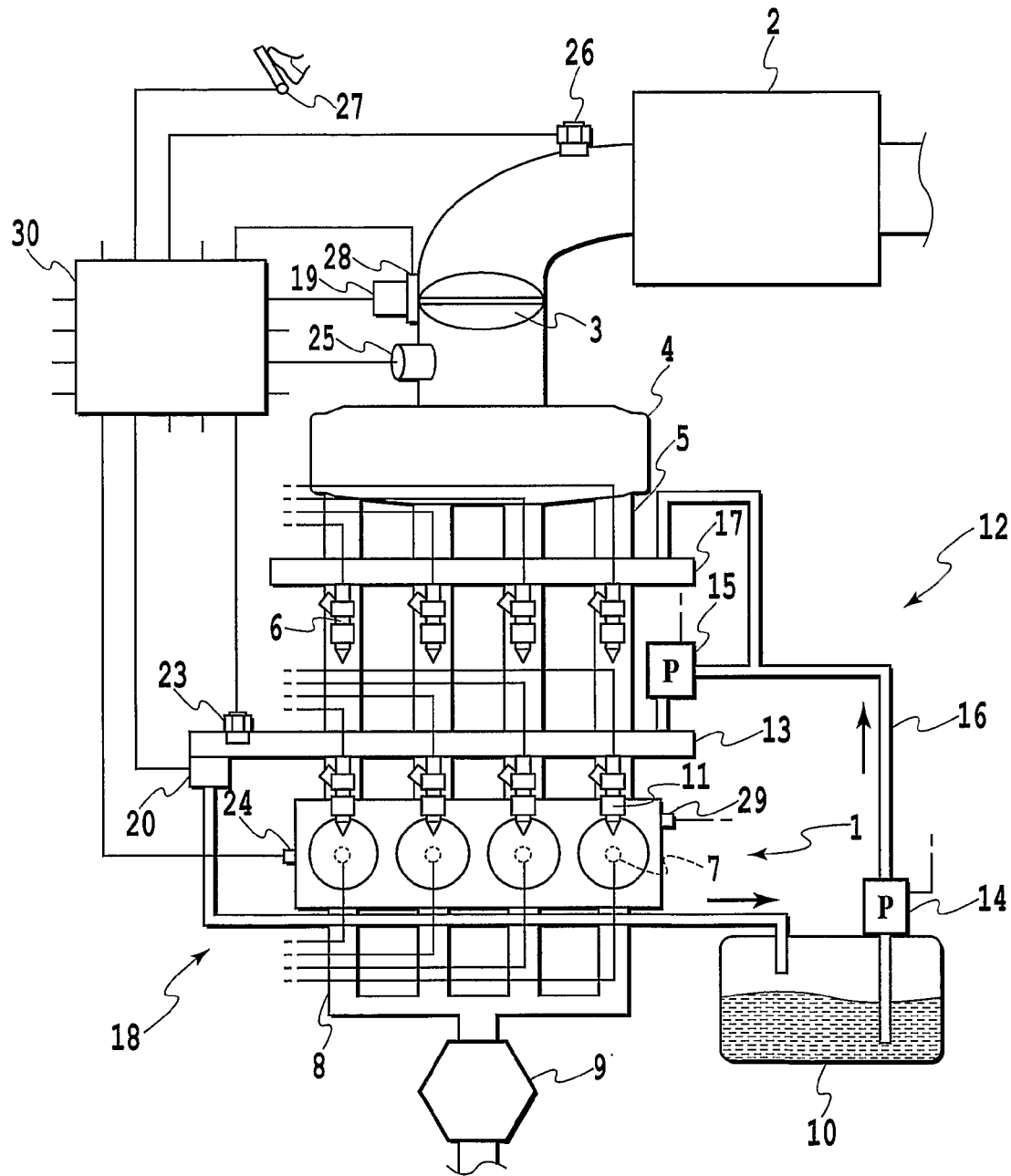
FIG. 1 is a plan view of a fuel injection control device for an engine according to one embodiment of the present invention.

FIG. 1 shows a fuel injection control device for an engine according to the embodiment. The illustrated engine 1 is of a so-called dual injection type wherein, while four cylinders are shown in the drawing, there is no limitation in the number of the cylinders. Each of the cylinders has a cylinder injector 11 for injecting a fuel in the cylinder and an air intake passage injector 6 for injecting a fuel to an air intake passage. The fuel used for the engine 1 is gasoline in this embodiment, but may be other fuels such as alcohol, a mixture thereof with gasoline or a gas fuel such as CNG.

Air sucked from an air cleaner (not shown) is taken into a combustion chamber of the respective cylinder sequentially through an air flow meter 2, an electrically controlled throttle valve 3, a surge tank 4 and an air intake passage 5. The air intake passage 5 includes an air intake port 41 (see FIG. 5) formed in a cylinder head of the engine 1 in correspondence to the respective cylinder, and an inner passage of an intake manifold attached to the cylinder head to be in communication with the air intake port. The air intake passage injector 6 of an electromagnetic type is provided in the respective cylinder so that the fuel is injected into the air intake passage 5. The air intake passage injector 6 of this embodiment is oriented and constructed to carry out the fuel injection toward the air intake port 41, especially to an exit thereof. The fuel thus injected is mixed with air to form a relatively homogeneous mixture gas in the combustion chamber of the cylinder. The air intake passage injector 6 is made to open by an ON signal output from an electronic control unit (hereinafter referred to as ECU) 30 to inject the fuel, and made to close by an OFF signal output from ECU 30 to stop the fuel injection. A period of the air intake passage fuel injection is set within a period before the opening of an air intake valve 42 (see FIG. 5) for opening/closing the exit of the air intake port, or such that it overlaps with at least part of the opening period of the air intake valve 42.

Figure 5:
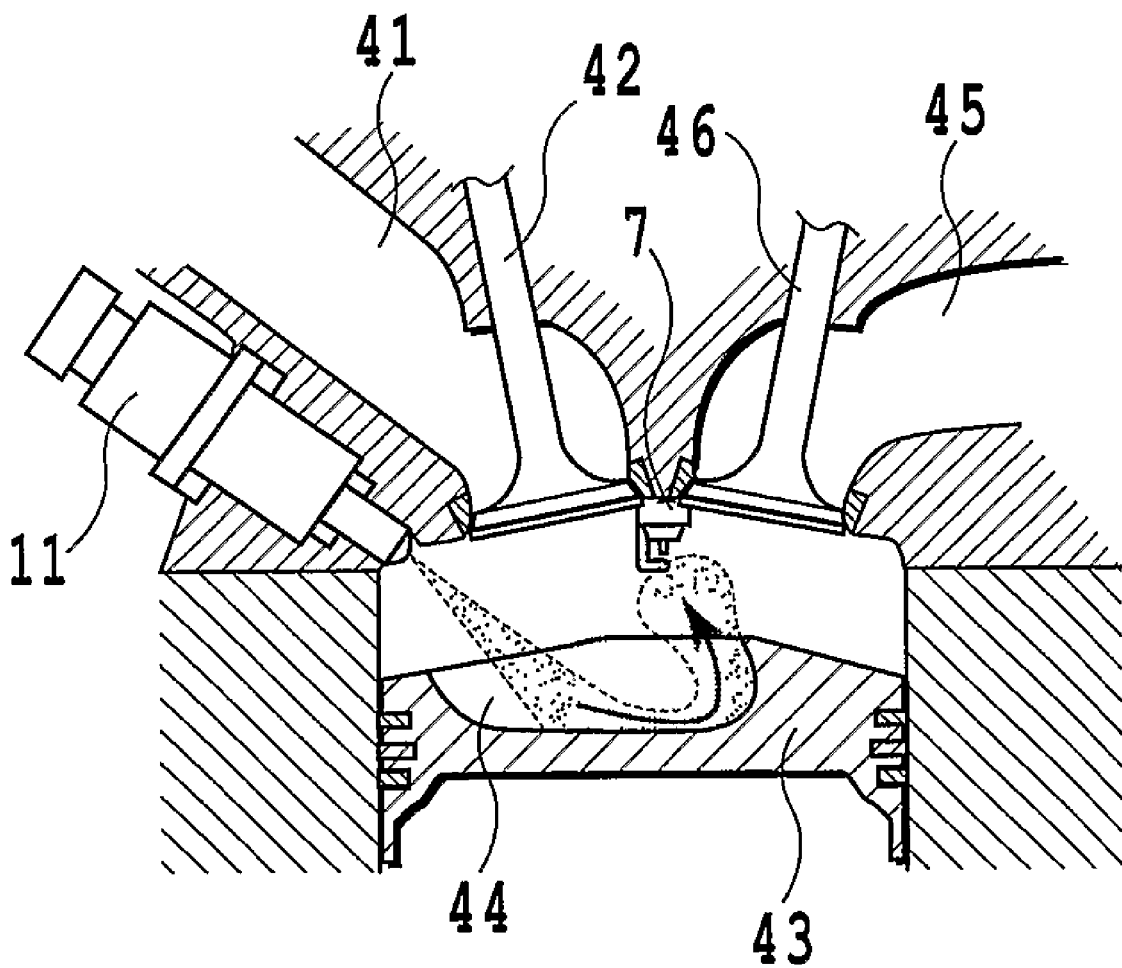
FIG. 5 is a cross-sectional view illustrating the fuel injection into the cylinder during the compression stroke.

On the other hand, the cylinder injector 11 of an electromagnetic type is provided in the respective cylinder for directly injecting the fuel into the combustion chamber thereof. The cylinder injector 11 according to this embodiment is adapted to inject fuel during one or both of the air intake stroke and the compression stroke. When the fuel injection is carried out during the compression stroke, as shown in FIG. 5, the fuel is injected toward a recess 44 provided in a top portion of a piston 43 moving upward, and is mixed with air as a tumble-like flow is generated along the inner surface of the recess 44 so that a gaseous mixture layer relatively rich in fuel content is formed in the vicinity of an ignition plug 7. The cylinder injector 11 is made to open by an ON signal output from ECU 30 to inject the fuel and made to close by an OFF signal output from ECU 30 to stop the fuel injection in a similar manner as in the air intake passage injector 6.

The gaseous mixture formed in the combustion chamber by one or both of the two fuel injection styles is ignited by the ignition plug 7 based on an ignition signal output from ECU 30 and burnt. Exhaust gas from the engine 1 is exhausted through an exhaust gas passage 8. The exhaust gas passage 8 includes an exhaust port 45 (see FIG. 5) formed in a cylinder head of the respective cylinder in the engine 1 and an inner passage of the exhaust manifold attached to the cylinder head in communication with the exhaust ports. An inlet of the air exhaust port 45 is opened/closed by an exhaust valve 46 (see FIG. 5). A catalyst 9 for cleaning the exhaust gas is disposed downstream of the exhaust manifold, and the downstream side of the catalyst 9 is connected to an exhaust pipe.

To the respective air intake passage injector 6 and cylinder injector 11, the fuel stored in a fuel tank 10 is supplied via a fuel supply system 12. The fuel supply system 12 includes a cylinder side delivery pipe 13 commonly connected to the respective cylinder injector 11, an air intake side delivery pipe 17 commonly connected to the respective air intake passage injector 6, a fuel supply tube 16 for supplying the fuel stored in the fuel tank 10 to the delivery pipes 13, 17, and a low pressure fuel pump 14 for pumping the fuel stored in the fuel tank 10 into the fuel supply tube 16. The fuel supply tube 16 is branched at a middle point into two parts which are connected to the delivery pipes 13, 17, respectively. A high pressure fuel pump 15 is provided at a position between the branched point and the cylinder side delivery pipe 13. The high pressure fuel pump 15 is adapted for pumping the fuel fed through the low pressure fuel pump 14 to the cylinder side delivery pipe 13 so that the pressure of the fuel in the cylinder side delivery pipe 13; i.e., the injection pressure for the cylinder injector 11; is increased to a relatively high level. The high pressure fuel pump 15 has a control valve for controlling a fuel flow rate therethrough by ECU 30. By controlling the fuel flow rate in such a manner, the pressure for the cylinder injection is controllable. Also, a fuel recovery system 18 is provided for positively recovering the fuel in the cylinder side delivery pipe 13 into the fuel tank 10. The fuel recovery system 18 is provided with a relief valve 20, the opening/closing of which is controlled by ECU 30 so that it is normally closed when the engine is operated. The cylinder side delivery pipe 13 is provided with a fuel pressure sensor 23 for detecting the pressure of fuel in the interior thereof.

ECU 30 is provided with a micro-computer including CPU, ROM, RAM, A/D transducer, input/output interface or others, and carries out a predetermined operation based on input signals received from various sensors to control the cylinder injector 11, the air intake passage injector 6, the ignition plug 7, a drive motor 19 for the electrically controlled throttle valve 3, the low pressure fuel pump 14, the high pressure fuel pump 13, the relief valve 20 or others.

Among the above-mentioned sensors, the air flow meter 2 and the fuel pressure sensor 23 are included. The air flow meter 2 is means for detecting an amount of the intake air and outputting a signal corresponding to a flow rate of the intake air passing therethrough to ECU 30. ECU 30 also calculates an engine load based on an output value of the air flow meter 2. Other sensors may be provided in the engine 1, such as a crank sensor 24 for detecting a crank phase of the engine. The crank sensor 24 outputs a pulse signal at a predetermined interval of the crank phase. Based on this pulse signal, ECU 30 detects the actual crank phase of the engine 1 and calculates the rotational speed.

Also, there are an intake air temperature sensor 26 for detecting the temperature of the intake air, an accelerator opening degree sensor 27 for detecting a treading distance of an accelerator pedal (the opening degree of an accelerator), a throttle position sensor 28 for detecting the opening degree of the throttle valve 3, a water temperature sensor 29 for detecting a temperature of cooling water for the engine 1 (hereinafter merely referred to as an engine water temperature), and an intake air pressure sensor 25 for detecting the internal pressure in the air intake passage 5 downstream from the throttle valve 3 in the above-mentioned sensor group.

The opening degree of the electrically controlled throttle valve 3 is controlled by ECU 30. That is, generally, ECU 30 controls the drive motor 19 so that an output from the throttle position sensor 28 becomes a value in correspondence to an output from the accelerator opening degree sensor 27. Also, ECU 30 controls the fuel pressure within the cylinder side delivery pipe 13; i.e., the cylinder injection pressure. That is, ECU 30 controls the high pressure fuel pump 15 so that a value detected by the fuel pressure sensor 23 coincides with a predetermined target value in correspondence to the operational condition of the engine. In this regard, a fuel pressure in the air intake side delivery pipe 17; i.e., the injection pressure for the air intake passage is not basically controlled but is maintained constant. The injection pressure for the air intake passage is lower than the injection pressure for the cylinder.

Next, the control carried out upon the starting of the engine, particularly in the cold start before the engine has been warmed up, by ECU 30 according to this embodiment will be described below. A term "cold" used herein is referred to a case wherein a temperature of engine water is lower than a predetermined value that would be reached after the engine has been warmed up. According to this embodiment, when the temperature of engine water is lower than 80° C., it is said the engine is cold. Contrarily, when the temperature of engine water is equal to or higher than the predetermined value that would be reached after the engine has been warmed up, that is, in this embodiment, when the temperature of engine water is equal to or higher than 80° C., it is said the engine is warm.

Initially, a summary of the control during the cold start will be described with reference to FIG. 4. Upon starting the cranking by a starter motor at an instant t0, the air intake passage fuel injection is carried out by the air intake passage fuel injector 6. When the initial combustion occurs during the cranking, the rotational speed Ne of the engine rapidly increases to reach a predetermined speed Ni (at instant t1). Thus, the starting control is over and an idling control begins so that the engine rotational speed Ne approaches a target idling rotational speed Nfi. Further, when the engine rotational speed Ne has reached the target idling rotational speed Nfi (at instant tfi) during the acceleration of the engine rotational speed Ne, the fuel injection into the cylinder occurs by the cylinder injector 11. The cylinder injection is a compression stroke injection carried out during the compression stroke (particularly in a latter period thereof) as described before.

At instant t2 after a predetermined time has passed from the starting instant t0 (that is, upon the completion of the predetermined period), the injection style is changed from the compression stroke cylinder injection to another style. The latter style is a combination of the air intake passage injection by the air intake passage injector 6, and the intake stroke cylinder injection and the compression stroke cylinder injection by the cylinder injector 11.

In the starting control, a map for amounts of fuel to be injected during the starting period in relation to the temperatures of engine water is preliminarily stored in a memory (ROM) of ECU 30, and ECU 30 calculates the amount of the starting fuel based on the temperature of engine water detected by the water temperature sensor 29 with reference to the map, and activates the cylinder injector 11 in a time period corresponding to the amount of the starting fuel thus obtained.

On the other hand, in the idling control, the target idling rotational speed Nfi is determined to be higher than the target idling rotational speed Ni (for example, 800 rpm) for the warming-up and become larger as the temperature of engine water is lower. That is, the map of the target idling rotational speeds in relation to the temperatures of engine water is preliminarily stored in the memory (ROM) of ECU 30. Thus, ECU 30 calculates the target idling rotational speed Nfi based on the temperature of engine water detected by the water temperature sensor 29 with reference to the map, and controls the amount of injected fuel so that the actual engine rotational speed Ne approaches the target idling rotational speed Nfi. As described above, according to this embodiment, a fast idling control is carried out during the cold start, for approaching the idling rotational speed of the engine to the target idling rotational speed Nfi higher than the target idling rotational speed Ni. Fast idling control means for executing this fast idling control is constituted by ECU 30. Although an engine rotational speed which is a threshold separating the starting control from the idling control is the same as the target rotational speed Ni for the warm start in this embodiment, it may be different from the latter.

During the fast idling control, the ignition timing is largely delayed from that in the warm start. While the ignition timing is set at 0° BTDC in this embodiment, it may be different therefrom. Thereby, as described above, the fuel component unburnt during the combustion stroke is exhausted from the combustion chamber and after-burnt in the exhaust port or exhaust manifold. By using high temperature exhaust gas thus generated, catalyst is quickly warmed up to reduce an amount of HC in the exhaust gas.

A total amount of fuel to be injected in the separate injection after the injection style is changed is divided at a predetermined ratio into the air intake passage injection, the intake stroke cylinder injection and the compression stroke cylinder injection, respectively. This ratio may be changed in accordance with the conditions of engine operation (for example, the temperature of engine water) or may be unvariable. When the ratio is changed, it is possible to determine the ratio at times in accordance with a predetermined map or operational form. The time period for the air intake passage injection within a time interval before the opening of an air intake valve 42 or it overlaps with at least part of the opening period of the air intake valve 42 in the same manner as described before.

Next, reasons for employing the above-mentioned injection style will be explained below.

Figure 6:
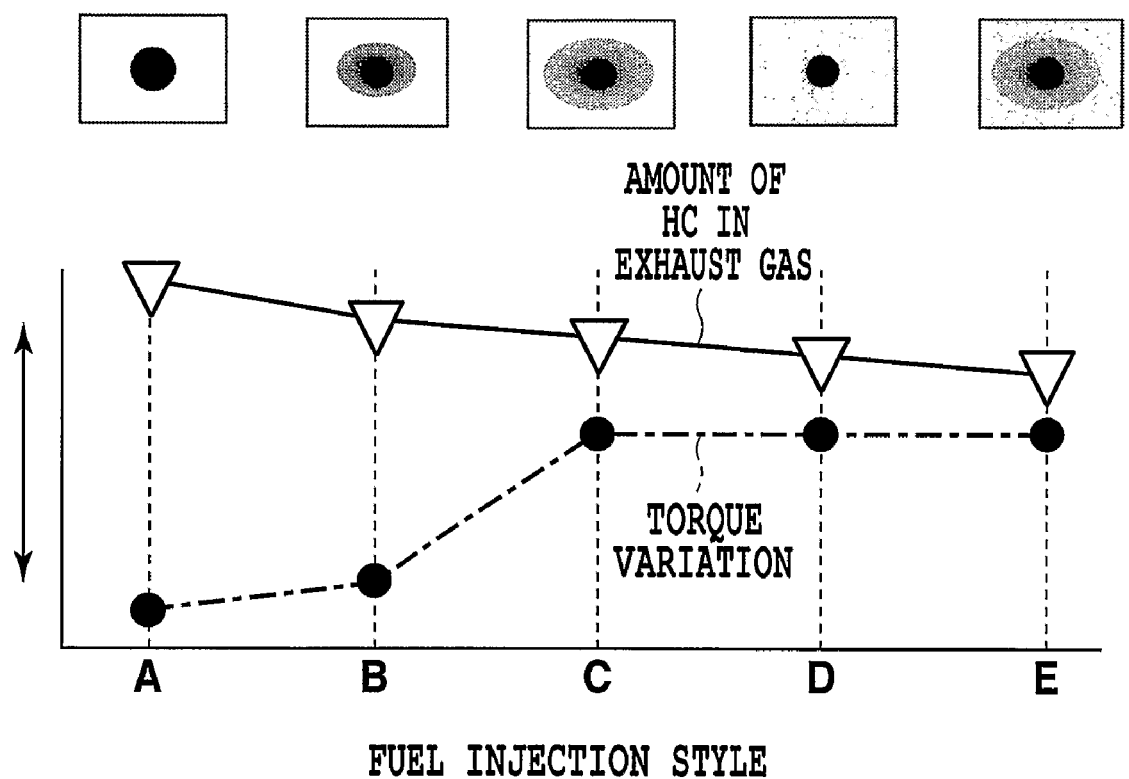
FIG. 6 shows characteristics of various fuel injection styles.

FIG. 6 shows characteristic properties of various injection styles A to E, wherein a lower graph illustrates the relationship between amounts of HC in the exhaust gas and the variation of torque corresponding to the respective injection styles during the cold start of the engine. Upper patterns illustrate the images of fuel distribution in the combustion chamber corresponding to the fuel injection styles A to E. In this regard, the contents of the respective fuel injection styles A to E are as follows.

A: the compression stroke cylinder injection
B: the compression stroke cylinder injection+the compression stroke cylinder injection
C: the intake stroke cylinder injection+the compression stroke cylinder injection
D: the air intake passage injection+the compression stroke cylinder injection
E: the air intake passage injection+the intake stroke cylinder injection+the compression stroke cylinder injection.

As apparent therefrom, the injection style A becomes E after the change according to this embodiment.

The graph shown in a lower part of FIG. 6 illustrates results obtained by experiments carried out on a practical engine. Regarding the amount of HC in the exhaust gas, the relationship of A>B>C>D>E was obtained, while regarding the variation in torque, the relationship of A<B<<C≈D≈E was obtained. Since the large variation in torque means that the combustion is unstable, the variation in torque is equivalent to the combustion stability. As apparent from this graph, in the style A, the variation in torque is minimum but the amount of exhaust HC is maximum; and in the style E, the variation in torque is inferior to A but the amount of HC in the exhaust gas is minimum.

For the purpose of improving the combustion stability, the style A is advantageous. The reason therefor is surmised that the gaseous mixture rich in fuel content can be stably formed around the ignition plug. On the other hand, the reason why the large amount of HC exists in the exhaust gas in the style A is surmised that, although the after-burning due to a large delay of the ignition timing promotes to heat up the catalyst, the fuel is not completely burnt and thereby a large amount of unburnt fuel component remains in the exhaust gas. In the style A, there is also a risk of the generation of black smoke because the gaseous mixture is rich in fuel content. If this risk is unavoidable, the style B may be adopted.

When the style C or D is adopted, it is possible to reduce the generation of HC to be less than in the styles A and B. This is because the gaseous mixture rich in fuel content is formed around the ignition plug to secure the combustion as well as gaseous mixture lean in fuel content existing therearound is usable for the after-burning in the exhaust passage. However, the combustion stability is worsened thereby. This is particularly significant when the temperature within the combustion chamber is low, for example, immediately after starting the engine.

In the style E, while the combustion stability is substantially in the same level as in the styles C and D, the amount of HC in the exhaust gas is less than in the other styles including C and D. The reason why the amount of HC in the exhaust gas is less is surmised as follows. That is, gaseous mixture rich in fuel content suitable for the ignition is formed around the ignition plug by the compression stroke cylinder injection, while homogeneous gaseous mixture lean in fuel content suitable for the after-burning is formed by the air intake passage injection, and further, gaseous mixture relatively rich in fuel content at an intermediate level between the above-mentioned two, suitable for the main combustion is formed by the intake stroke cylinder injection. Thus, according to the style E, the ignition stability, the combustion stability and the after-burning are simultaneously achievable. On the other hand, since a ratio of fuel amount injected in the compression stroke cylinder injection becomes necessarily smaller in such a separate fuel injection style, the degree of stratification is lowered in the vicinity of the ignition plug, and the combustion stability becomes worse when the temperature in the combustion chamber is low.

Figure 4:
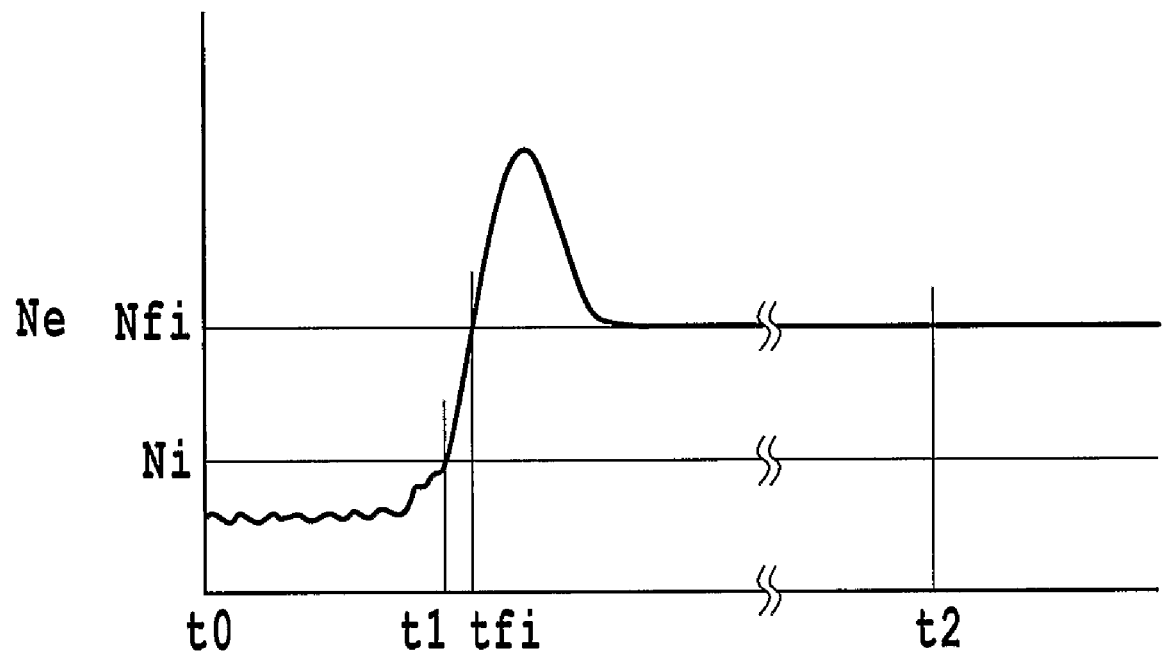
FIG. 4 is a time chart illustrating the variation of an engine rotational speed during the cold start.

In view of the above consideration, according to this embodiment, the fuel injection in the style A is adopted in a predetermined period from the instant tfi immediately after the cold start of the engine to the instant t2 as shown in FIG. 4, and the fuel injection in the style E is adopted (at the instant t2) after the predetermined time has passed, so that the fuel injection style is changed during the fast idling or the fast idling control. Thereby, it is possible to have, before the change of the injection style, a merit of the style A; that is, the preferable combustion stability and the restriction of torque variation when the temperature in the combustion chamber is low, and, to have, after the change of the injection style, a merit of the style E; that is, the reduction of the amount of exhaust HC due to the acceleration of the warming-up of catalyst. In other words, during the predetermined period after the starting of engine, the high-stability combustion is carried out while using the gaseous mixture having a high degree of stratification, then after the interior of the combustion chamber has been warmed up to some extent, the fuel injection style is changed to increase fuel amount for the after-burning so that the temperature of exhaust gas rises to accelerate the warming-up of catalyst and restrict the generation of HC in the exhaust gas. In such a manner, it is possible to achieve excellent characteristic properties throughout the period from the start of engine to the completion of fast idling, whereby both of the amount of HC in the exhaust gas and the combustion stability during the cold start are optimized.

Figure 2:
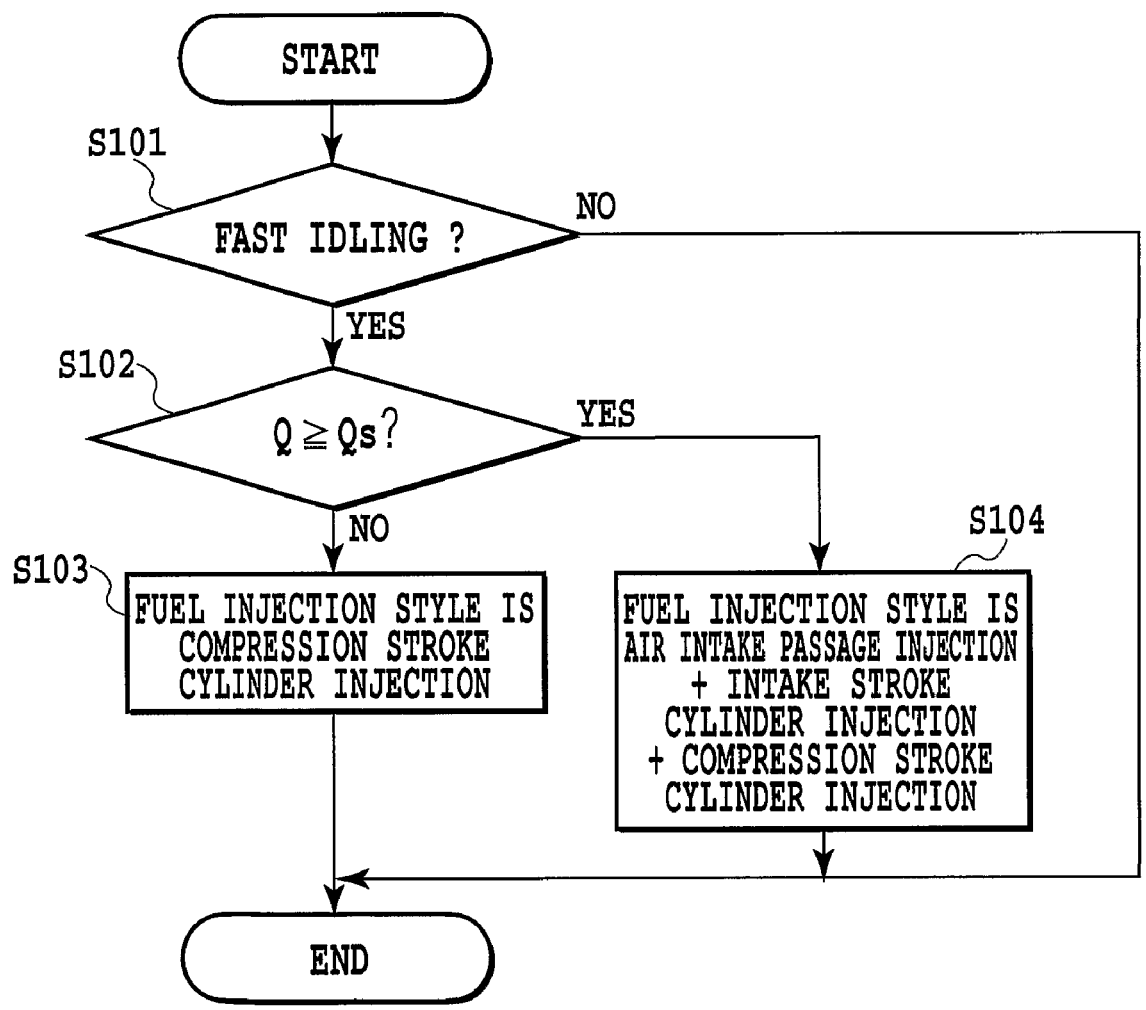
FIG. 2 is a flow chart of a processing routine for controlling the change of the fuel injection styles according to this embodiment.

Next, one example of the control for changing the fuel injection style will be described based on a flow chart shown in FIG. 2. This flow chart illustrates a processing routine executed by ECU 30 in each of the injection cycles.

At step S101, it is determined whether or not the fast idling is proceeding (that is, the fast idling is being controlled). If all conditions described below have been satisfied, the answer is YES.

(1) The temperature of engine water detected by the water temperature sensor 29 is lower than a predetermined value. In this embodiment, the predetermined value is 80° C. indicating that the engine is still cold.

(2) The rotational speed of engine detected by the crank sensor 24 is higher than a predetermined value. In this embodiment, the predetermined value is 800 rpm which is equal to the target idling rotational speed after the engine has been warmed up.

(3) The ignition timing is delayed from that after the engine has been warmed up. For example, the ignition timing is set at 0° BTDC.

(4) The opening degree of accelerator detected by the accelerator opening degree sensor 27 is zero. That is, this is a case when a driver does not tread on an accelerator pedal.

If it is determined at step S101 that the fast idling is not being executed (i.e., if the answer is NO), this control is over.

If it is determined at step S101 that the fast idling is being executed (i.e., if the answer is YES), the routine proceeds to step S102 at which it is determined whether or not the predetermined period has passed from the beginning of the cold start of engine. In this embodiment, this is carried out by determining whether or not an integrated intake air amount Q after the starting of engine exceeds a predetermined value Qs.

Figure 3:
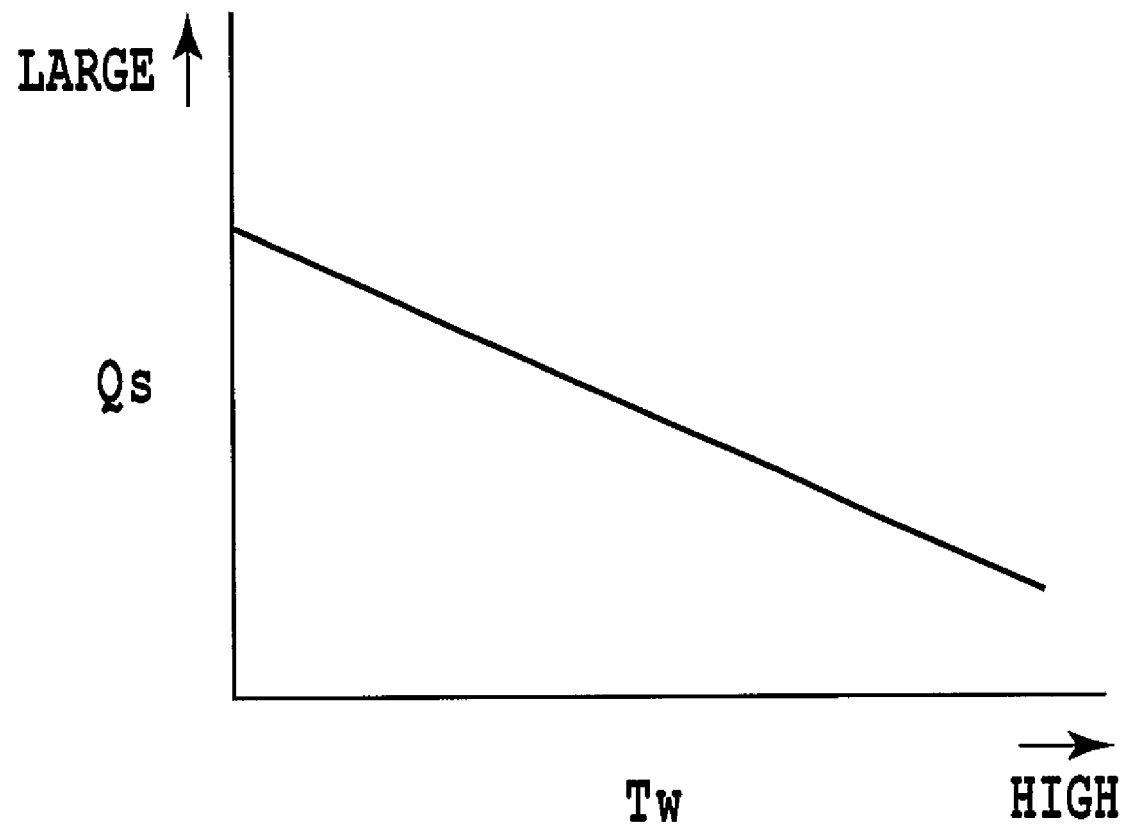
FIG. 3 is a map for determining a threshold of an integrated intake air amount.

In this regard, ECU 30 sequentially integrates amounts of intake air detected by the air flow meter 2 from an instant at which the engine starts (t0 in FIG. 4), and the integrated intake air amount Q obtained thereby is compared with the predetermined threshold Qs for the purpose of the above-mentioned determination. The threshold Qs is obtained from a map shown in FIG. 3. This map illustrates the relationship between the temperature Tw of engine water and the threshold Qs, wherein the higher the temperature Tw of engine water is, the lower the threshold Qs is. This map is preliminarily made based on results obtained by experiments carried out on a practical engine, and stored in ECU 30. ECU 30 detects the temperature Tw of engine water by the water temperature sensor 29 at the beginning of cold start of engine (t0 in FIG. 4) and reads the threshold Qs corresponding to the detected temperature Tw from the map and stores the same. Then ECU 30 compares the integrated value Q of intake air amounts with the threshold Qs to determine whether or not Q exceeds Qs.

According to the above procedure, it is possible to make the threshold Qs to be higher as the temperature of engine water is lower at the beginning of the engine start, whereby the change of the fuel injection style from A to E can be delayed. That is, in a case wherein the temperature in the combustion chamber does not so smoothly rise and the combustion stability is liable to remain in the worse condition as the temperature of engine water is lower at the beginning of the engine start, the fuel injection style A is made to continue for a longer period so that the combustion stability has the preference. Contrarily, if the temperature of engine water is high at the beginning of the engine start, a lower threshold Qs is obtainable to earlier carry out the change in the fuel injection style from A to E. That is, since a period wherein the temperature in the combustion chamber is cold becomes shorter as the temperature of engine water is higher at the beginning of the engine start, the favorable combustion stability is relatively quickly achievable. Thus, the fuel injection style can be changed from A to E at an early time, whereby the acceleration of the catalyst warming-up to reduce the amount of HC in exhaust gas is preferential.

Now, reference is again returned to FIG. 2. At step S102, when the integrated intake air amount Q after the starting of engine is yet lower than the predetermined value Qs (i.e., if the answer is NO at S102), the routine proceeds to step S103 to adopt the compression stroke cylinder injection (the style A). On the other hand, if the integrated intake air amount Q after the starting of engine is equal to or more than the predetermined value Qs (i.e., if the answer is YES at S102), the routine proceeds to step S104 to adopt the air intake passage injection+the intake stroke cylinder injection+the compression stroke cylinder injection (the style E). The timing at which the determination is changed at step S102 is the timing of changing the fuel injection style, which corresponds to t2 in FIG. 4. Thus, the control is over.

In this control, the determination whether or not the fuel injection style is to be changed is not based on the temperature of engine water but on the integrated intake air amount at step S102. The reason therefor is that the integrated intake air amount is better reflected the temperature in the combustion chamber than the water temperature. That is, the temperature rise in the combustion chamber is faster than that in engine water and the temperature in the combustion chamber largely effects on the combustion stability. The temperature in the combustion chamber relies on the frequency/degree of combustion in the combustion chamber. Accordingly, the determination whether or not the temperature in the combustion chamber reaches a value at which the combustion is stable is preferably based on a parameter reflecting the frequency/degree of combustion. Therefore, at step S102, the determination is made based on the integrated amount of intake air rather than the temperature of engine water. According thereto, the timing for changing the fuel injection style becomes more proper than base on the temperature of engine water to avoid the inconvenience, for example, that the combustion abruptly becomes unstable after changing the fuel injection style.

By the same reason, the determination at step S102 may be made based on the integrated amount of fuel injected from the beginning of engine start. Note the determination may be made based on other parameter; for example, it may be made simply based on a time period passed from the beginning of the engine start, although the determination based on the integrated amount of intake air or injected fuel is preferable.

The amount of intake air used for this purpose is directly measured by the air flow meter 2 in this embodiment. However, other method may be adopted. For example, the amount of intake air may be calculated by ECU 30 from an intake air pressure detected by the intake air pressure sensor 25 and the temperature of intake air detected by the intake air temperature sensor 26. In this case, means for detecting the amount of intake air is constituted by the intake air sensor 25, the intake air temperature sensor 26 and ECU 30.

In this embodiment, ECU 30 constitutes means for changing the fuel injection style and means for calculating the integrated amount of intake air. The means for calculating the integrated amount of intake air calculates the integrated amount of intake air by integrating amounts of intake air detected by the means for detecting the amount of intake air from the beginning of the cold start of engine. Or, ECU 30 may constitute means for calculating the integrated amount of injected fuel from the beginning of the cold start of engine.

While one embodiment of the present invention has been described as mentioned above, the present invention should not be limited thereto, but includes other various embodiments. For example, the temperature of engine water may be replaced by an oil temperature or a temperature of cylinder block. Numeric values adopted in the above-mentioned embodiment are mere examples which may be variable in accordance with conditions. Further, it may be possible to carry out various operations in accordance with operational formulas instead of maps.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes and modifications as fall within the true spirit of the invention.

INDUSTRIAL APPLICABILITY

The present invention may be applicable to an engine provided with a cylinder injector for injecting fuel into a cylinder and an air intake passage injector for injecting fuel into an air intake passage.

The invention claimed is:

1. A fuel injection control device for an engine comprising a cylinder injector and an air intake passage injector, wherein means is provided for changing a fuel injection style, from a compression stroke cylinder injection by the cylinder injector which is executed from a predetermined instant immediately after the beginning of the cold start of engine until a predetermined period has passed, to the combination of an air intake passage injection by the air intake passage injector, an intake stroke cylinder injection and a compression stroke cylinder injection by the cylinder injector which is executed after the predetermined period has passed, and characterized in that an instant at which the predetermined period finishes is an instant at which the amount of intake air integrated from the beginning of the cold start of engine reaches a predetermined threshold, and in that the threshold is obtained based on a temperature of engine water at the beginning of the cold start of engine.

2. A fuel injection control device for an engine as defined by claim 1, wherein the threshold of the integrated amount of intake air is lower as the temperature of engine water at the beginning of the cold start of engine is higher.

3. A fuel injection control device for an engine comprising a cylinder injector and an air intake passage injector, wherein means is provided for changing a fuel injection style, from a compression stroke cylinder injection by the cylinder injector which is executed from a predetermined instant immediately after the beginning of the cold start of engine until a predetermined period has passed, to the combination of an air intake passage injection by the air intake passage injector, an intake stroke cylinder injection and a compression stroke cylinder injection by the cylinder injector which is executed after the predetermined period has passed, and characterized in that an instant at which the predetermined period finishes is an instant at which the amount of injected fuel integrated from the beginning of the cold start of engine reaches a predetermined threshold, and in that the threshold is obtained based on a temperature of engine water at the beginning of the cold start of engine.

4. A fuel injection control device for an engine as defined by claim 3, wherein the threshold of the integrated amount of injected fuel is lower as the temperature of engine water at the beginning of the cold start of engine is higher.

* * * * *